May 20, 1958  R. E. P. MIERS  2,835,281
PRODUCTION OF SPRING INTERIORS FOR MATTRESSES AND THE LIKE
Filed Jan. 17, 1955  15 Sheets-Sheet 1

INVENTOR
BY Richardson, David and Nordon
his ATTORNEYS

May 20, 1958 R. E. P. MIERS 2,835,281
PRODUCTION OF SPRING INTERIORS FOR MATTRESSES AND THE LIKE
Filed Jan. 17, 1955 15 Sheets-Sheet 3
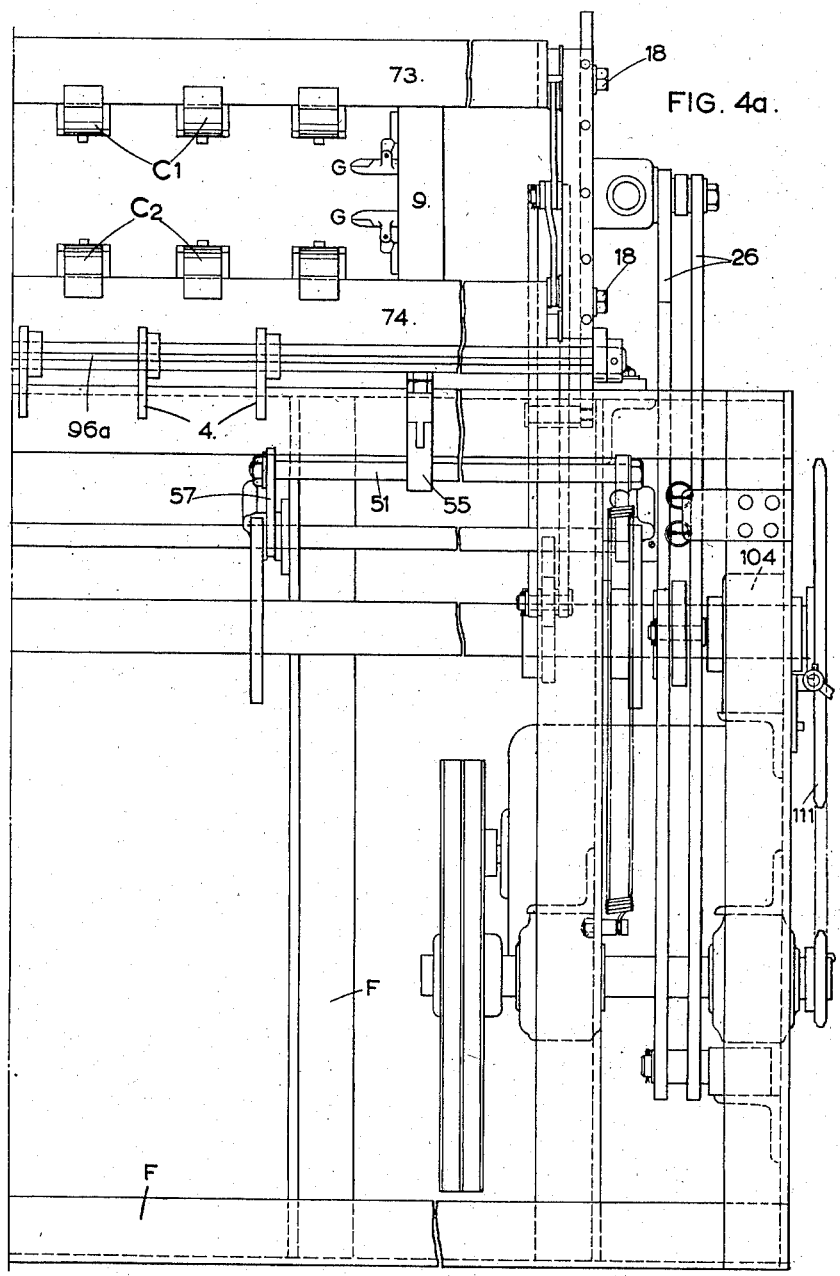
Richard Eustace Probyn Miers
INVENTOR
By Richardson, David and Nordon
his ATTORNEYS.

May 20, 1958  R. E. P. MIERS  2,835,281
PRODUCTION OF SPRING INTERIORS FOR MATTRESSES AND THE LIKE
Filed Jan. 17, 1955  15 Sheets-Sheet 6

May 20, 1958 R. E. P. MIERS 2,835,281
PRODUCTION OF SPRING INTERIORS FOR MATTRESSES AND THE LIKE
Filed Jan. 17, 1955 15 Sheets-Sheet 7

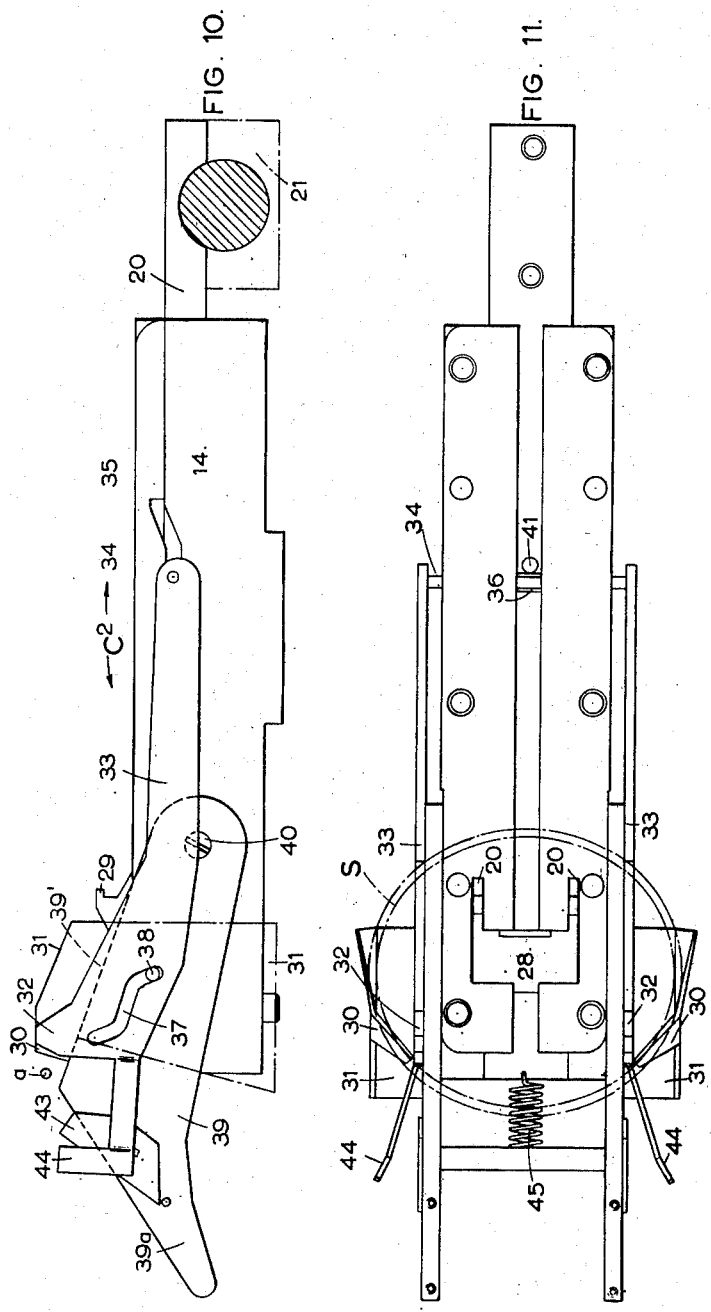

May 20, 1958 R. E. P. MIERS 2,835,281
PRODUCTION OF SPRING INTERIORS FOR MATTRESSES AND THE LIKE
Filed Jan. 17, 1955 15 Sheets-Sheet 10
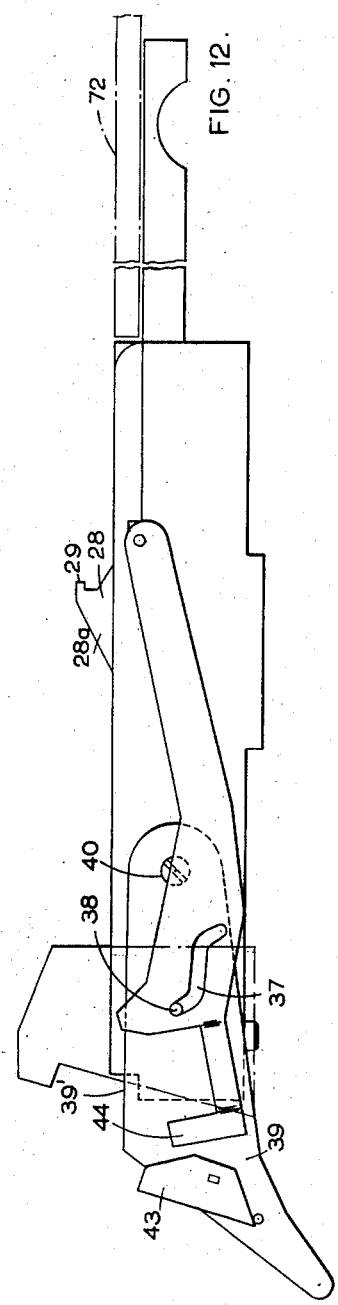

May 20, 1958  R. E. P. MIERS  2,835,281
PRODUCTION OF SPRING INTERIORS FOR MATTRESSES AND THE LIKE
Filed Jan. 17, 1955  15 Sheets-Sheet 11

Richard Eustace Probyn Miers
INVENTOR
BY Richardson, Davis and Nordon
his ATTORNEYS.

May 20, 1958   R. E. P. MIERS   2,835,281
PRODUCTION OF SPRING INTERIORS FOR MATTRESSES AND THE LIKE
Filed Jan. 17, 1955   15 Sheets-Sheet 12

Richard Eustace Probyn Miers
INVENTOR
BY Richardson, Davis and Norden
ATTORNEYS.

United States Patent Office 2,835,281
Patented May 20, 1958

2,835,281

PRODUCTION OF SPRING INTERIORS FOR MATTRESSES AND THE LIKE

Richard Eustace Probyn Miers, London, England, assignor to Pullman (Patent) Products Limited, London, England, a British company Application January 17, 1955, Serial No. 482,308

Claims priority, application Great Britain January 22, 1954

15 Claims. (Cl. 140—3)

This invention relates to the production of spring assemblies for inserting in mattresses, cushions and the like, and in which the assemblies comprise each a plurality of helical or hour-glass furniture springs arranged in rows the successive rows being connected together by the tie wires embodying deformable hook-like parts capable of being engaged with end convolutions of the springs so that in the direction transverse to the directions of the tie wires the springs can be coupled together in lines.

The tie wires are of the type each having a number of normally equi-distantly spaced sinuous hook-like parts bent out therefrom, the hook-like parts being so shaped that a portion of each hook-like part embraces one spring end and another portion the adjacent spring end. A suitable known form of tie wire for this purpose is that shown in Patent No. 2,232,072 in which S-shaped deformations are spaced equi-distantly along each length of the wire and disposed uni-laterally of the wire and adapted each to pass sinuously over and under the slightly overlapping substantially co-planar end convolutions of a pair of springs, the deformations thereafter being clinched closely on to the springs.

The object of the present invention is to increase the rate of production and accuracy of assembly of the assemblies.

According to the present invention a method of producing spring assemblies so as to produce a complete assembly in which parallel lines of springs are obtained with the end convolutions of the springs coupled together by tie wires parallel and alternating with the lines of springs and interlaced with to the springs by pre-formed hook-like parts of the tie wires inter-engaged with the said end convolutions, comprises assembling the successive lines of springs into close relationship with each other and following each such assembling operation locating two tie wires in parallel spaced relationship and feeding them simultaneously to positions across the end convolutions of the two lines of springs, thereupon imparting an axial twisting operation simultaneously to the two tie wires to inter-engage the hook parts of the tie wires with the spring end convolutions, and thereupon feeding the inter-engaged springs and tie wires beyond the tie-wire receiving stage so as to build up progressively a continuous train of lines of springs coupled by tie wires until the desired length of assembly is attained.

It will be understood that in a finished furniture spring assembly the end convolutions at the top and base of the assembly are substantially co-planar although, as is preferred, they overlap each other in successive rows with the tie wires passing close to the points of intersection of the spring ends, the S-shaped bends each passing over one spring end convolution and under the adjacent spring end convolution this giving a close and firm fastening together of the springs.

Further in accordance with the present invention a method of producing spring assemblies embodying the latter mentioned arrangement comprises locating and supporting a first row of springs at the desired spacing, locating adjacent to the end convolutions of the springs two tie wires parallel with the row of springs, deforming the top and bottom convolution of the furniture springs so that their planes, instead of being parallel, are inclined to each other, introducing the next to be assembled row of springs and deformed in a like but opposite manner to the first row so that the planes of the top convolutions of each pair of springs substantially intersect at a chord common to both, and likewise the same with the bottom convolutions, the common chord being of length such as to allow the S shaped portions of the tie wires to rotate in the space between the arcs between the top and bottom convolutions that have the chord common to each, rotating the tie wires to engage the arcs of the second row of springs, then applying a pull to the springs so as to reduce the length of the common chord at the same time allowing the planes of the end convolutions to become substantially co-planar and rotating the tire wires so that the arcs of the first row of springs are engaged by the S-shaped portion of the tie wires thus locking the two rows of springs together on both top and bottom convolutions simultaneously and moving the two rows of springs with their tie wires a distance such as to bring the second row of springs into the position formerly occupied by the first row of springs and repeating the cycle of operations with successive rows of springs and pairs of tie wires until the desired length of assembly is achieved.

If desired during the feeding of the interengaged springs and tie wires beyond the tie wire receiving stage the tie wire hooks can be subjected to a pinching operation to clinch them on to the spring end convolutions. However, the clinching operations can be performed by separate clinching machines, e. g. such as described in co-pending application Serial No. 409,468.

A machine for assembling spring interiors for mattresses and the like according to the present invention comprises a row of pairs of springs positioning devices between each pair of which a spring is gripped, means to feed the lines of tie wires in pairs in succession towards the row of springs held in said positioning devices so as to locate the tie wires across the insides of the end convolutions of said springs, gripper means operated automatically following the said location of the tie wires gripping the ends of the tie wires, means to locate a further row of springs close to the aforesaid row of springs, means imparting axial turning to the tie wire gripper means to inter-engage the hook-like parts of the tie wires with the end convolutions of two successive lines of springs so as to link the two rows of springs together, and means drawing the inter-connected springs and tie wires away from their positions at which the said linking together operation is effected a distance such as to locate the second mentioned row of springs in the position occupied previously by the said first mentioned row of springs.

Further in accordance with the present invention a machine for assembling spring interiors for mattresses or the like comprises a machine frame having locating means to locate a row of the springs in the machine ready to receive two tie wires, means to feed a pair of tie wires to positions close to and inside the planes of the upper and lower convolutions of the said row of springs, means to locate a further row of springs close to the aforesaid row of springs so that the planes of such convolutions of one row substantially intersect the planes of the end convolutions of the other row at a chord at the top and another at the bottom common to both, two pairs of grippers in which the ends of the tie wires are received and held automatically following offering up the tie wires to the first mentioned row of springs, compressing means with said locating means to compress the chord of the end convolutions of the springs towards the tie wires so that the arcs common to the chords can be engaged by the hook like parts of the tie wires, means to impart to the tie wire grippers oscillatory movement about their axes to hook the tie wires by their hook-like parts to the end convolutions of both rows of springs so as to couple the two rows of springs together, means to effect the feeding of the coupled up two rows of springs between each coupling operation and comprising reciprocating jaws receiving at one terminal position the interengaged lines of springs and tie wires and having a stroke approximately equal to the distance between a successive pair of rows of the assembly so as to drag to its other terminal position the assembly of springs and tie wires and having an idle movement back from said latter terminal position.

When it is required to clinch the tie wires to the springs in the assembling machine this can be effected by providing clinching jaws at the other terminal position of the reciprocating jaws, means automatically actuating the clinching jaws following location of the appropriate springs and tie wires therein so that the tie wires are clinched to the springs resulting in the clinched rows of springs and tie wires subsequently being fed on to a collecting table upon said reciprocating jaws bringing the next in succession unclinched tie wires and springs to the clinching jaws.

The feed-in end of the machine includes an upper and a lower line of spring locators in advance of the work receiving parts of said reciprocating jaws and between which the springs are held under slight compression, means to feed an upper and a lower tie wire between said spring locators and into juxtaposition with the row of springs in said locators, means with said locators to receive and grip under slight compression a second row of springs so as to hold said two lines of successive rows of springs in position with end convolutions thereof close together to receive the said two tie wires, an upper and lower pair of co-axial tie wire receiving grippers receiving the ends of the tie wires, and means to impart an oscillation to said grippers to inter-engage the hook-like parts of the tie wires with the spring ends.

An embodiment of the invention is illustrated by the accompanying drawings wherein.

Figure 4:
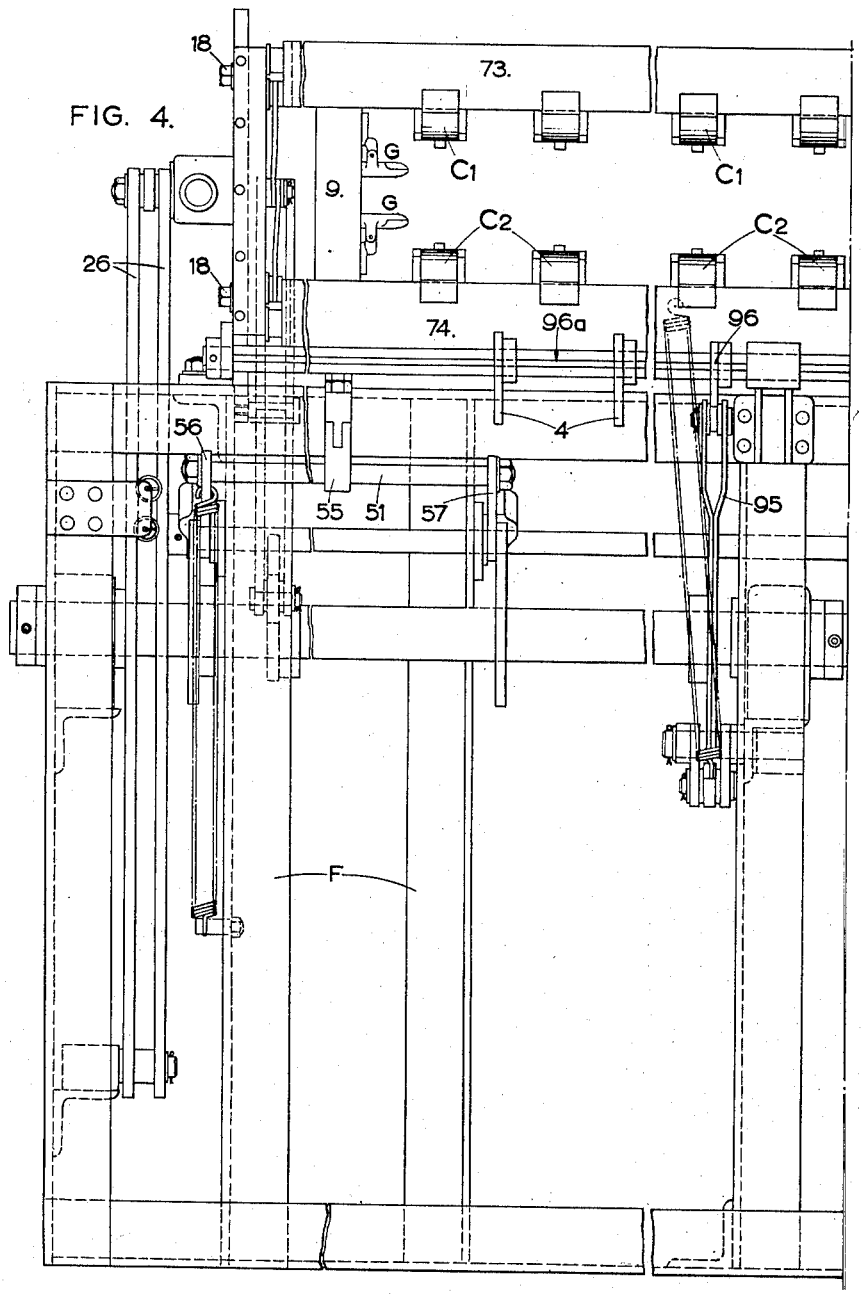

Figures 4 and 4A when combined comprise a front elevation of the machine.

Figure 5:
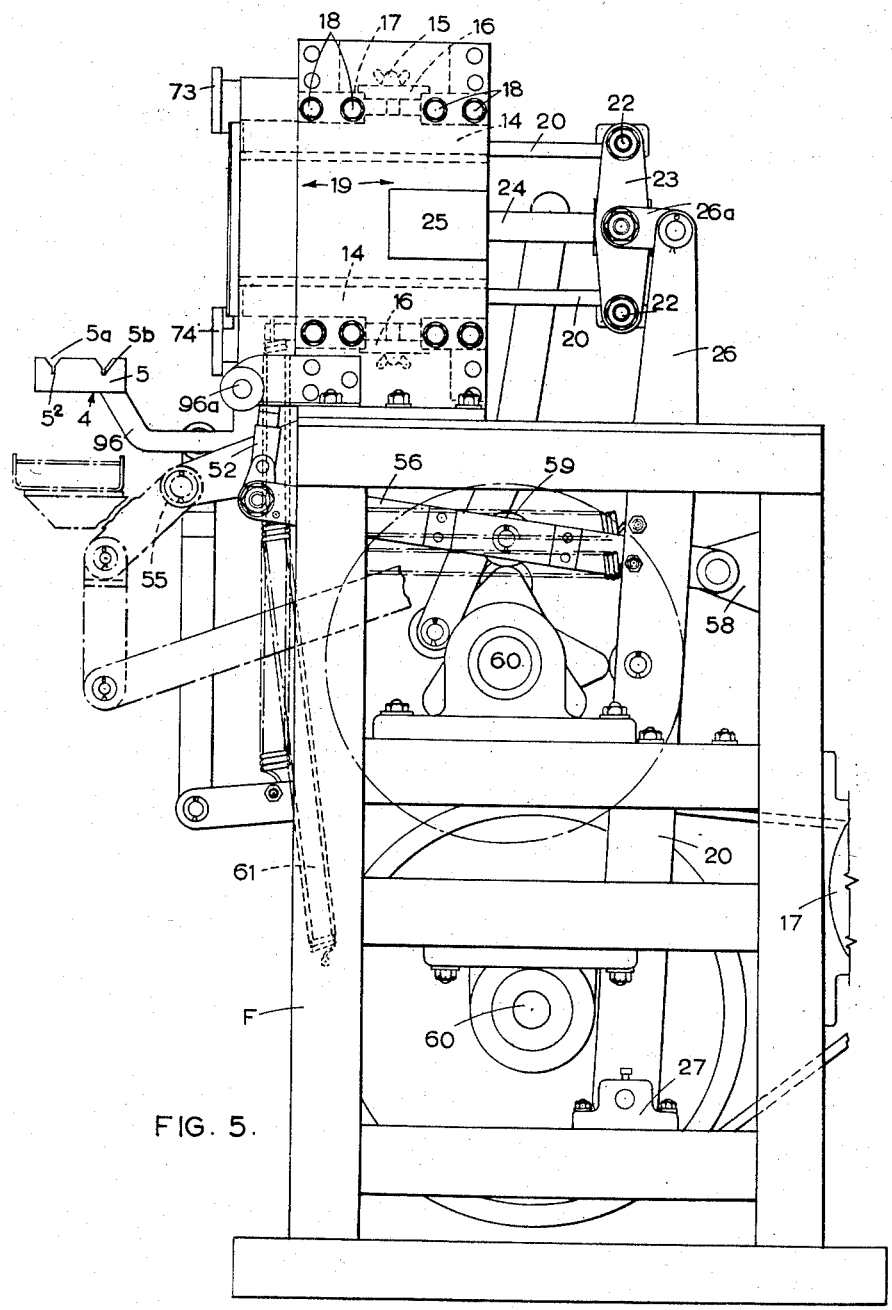

Figure 5 is a side elevation view of the machine.

Figure 5A is a detail side elevation view of a modification.

Figure 6:
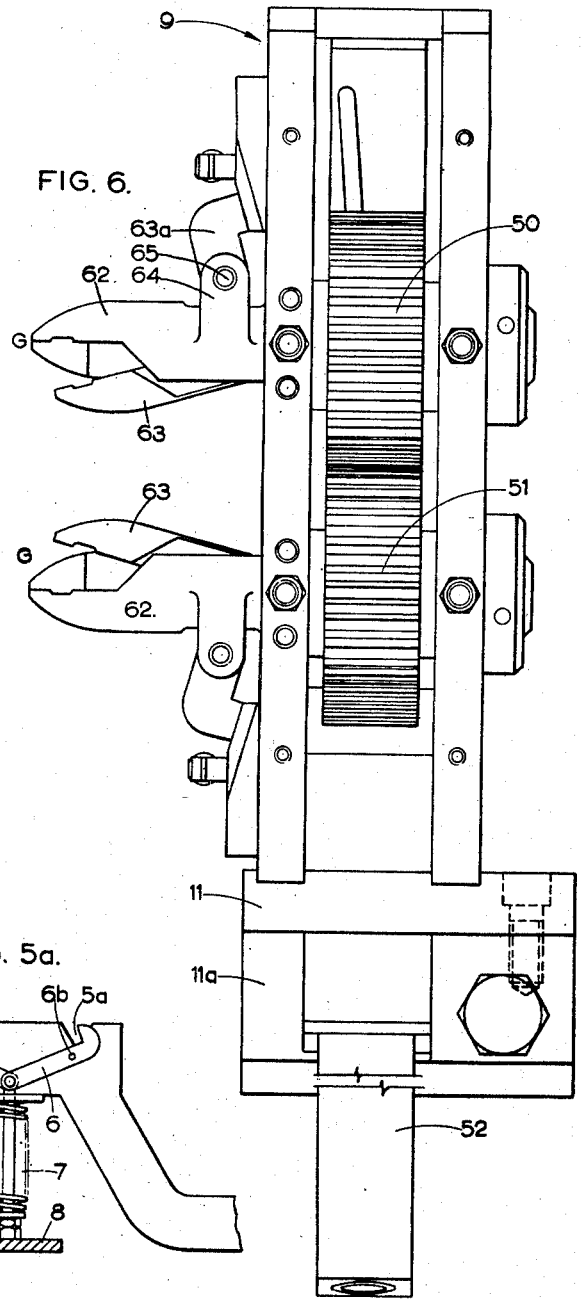

Figure 6 is a side elevation view of one of the pairs of rotary grippers for the tie wires.

Figure 7:
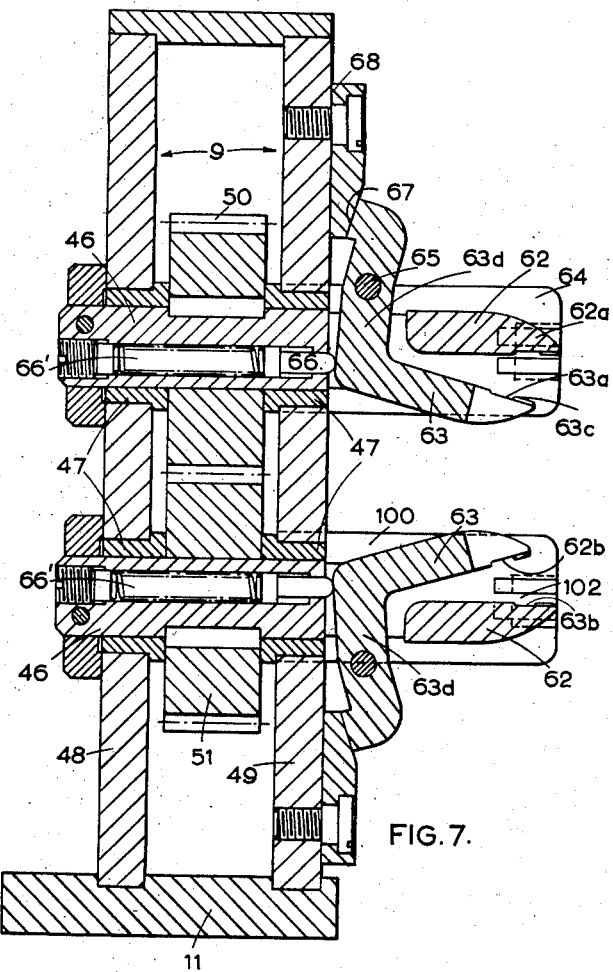

Figure 7 is a sectional elevation of the other pair of rotary grippers.

Figure 8:
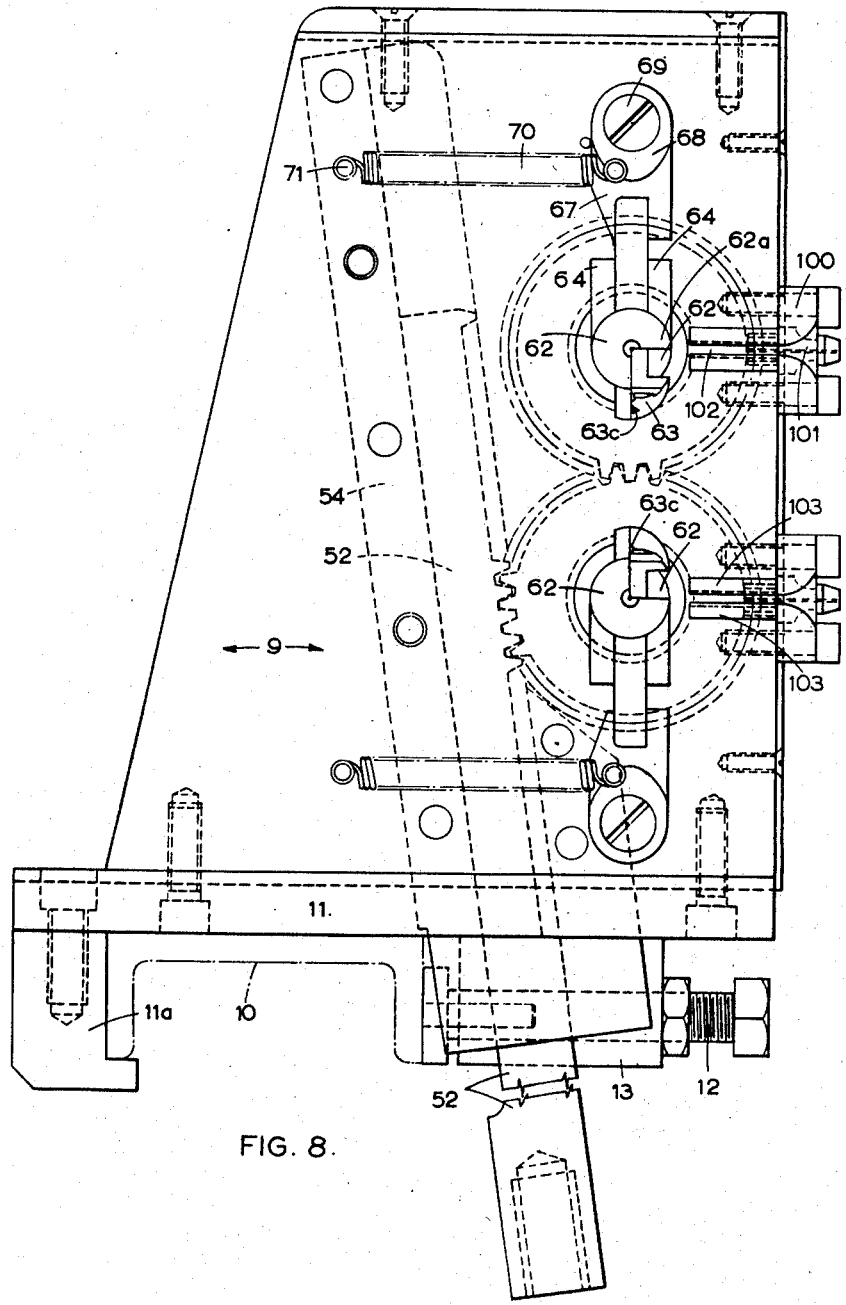

Figure 8 is a side elevation view of Figure 6.

Figure 9:
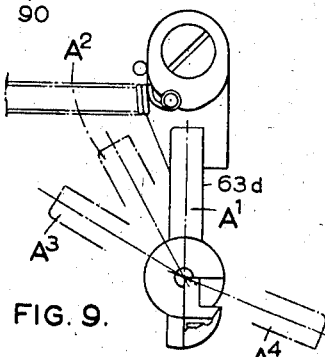

Figure 9 is a diagrammatic view showing the sequence of operations of one of the grippers.

Figures 10 and 11 are side elevation and plan views respectively of one of the spring compressors and feeding devices showing them in their normal condition.

Figure 12 is a side elevation view of a compressor but showing it in the condition at the completion of a rearward feeding of the springs.

Figure 13:
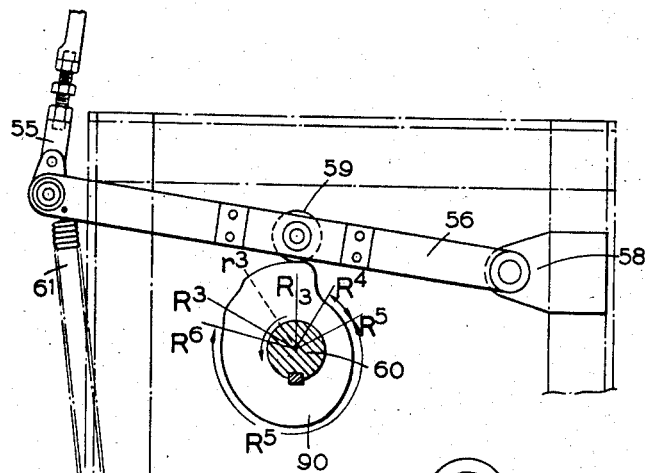

Figure 13 is a diagrammatic side elevation view showing the cam for operating the grippers.

Figure 14:
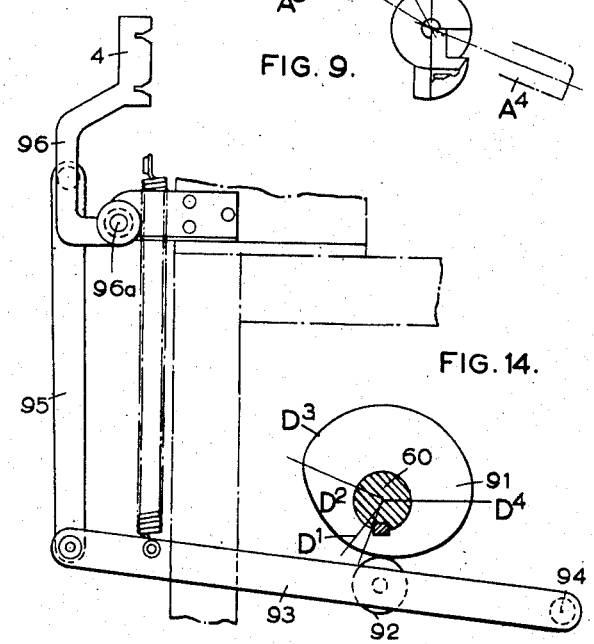

Figure 14 is a side elevation view showing the cam arrangement for operating the wire holder.

Figure 15:
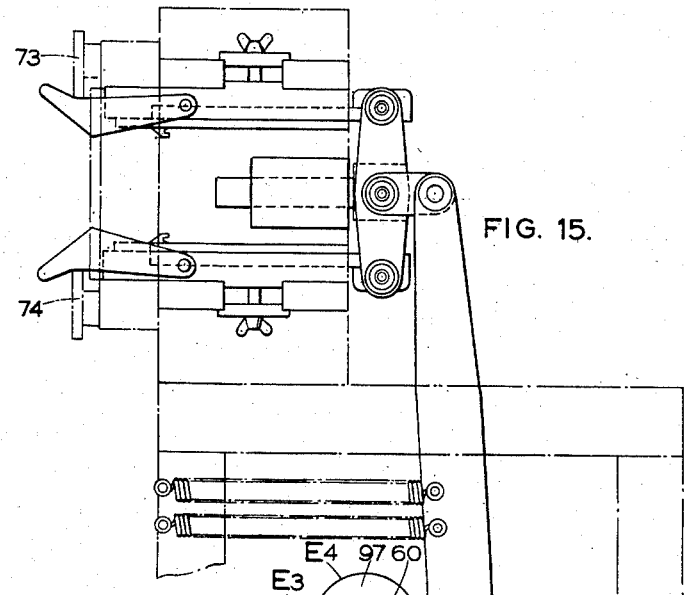

Figure 15 shows the cam arrangement for operating the sliding jaws which feed the springs rearwardly.

Figure 16:
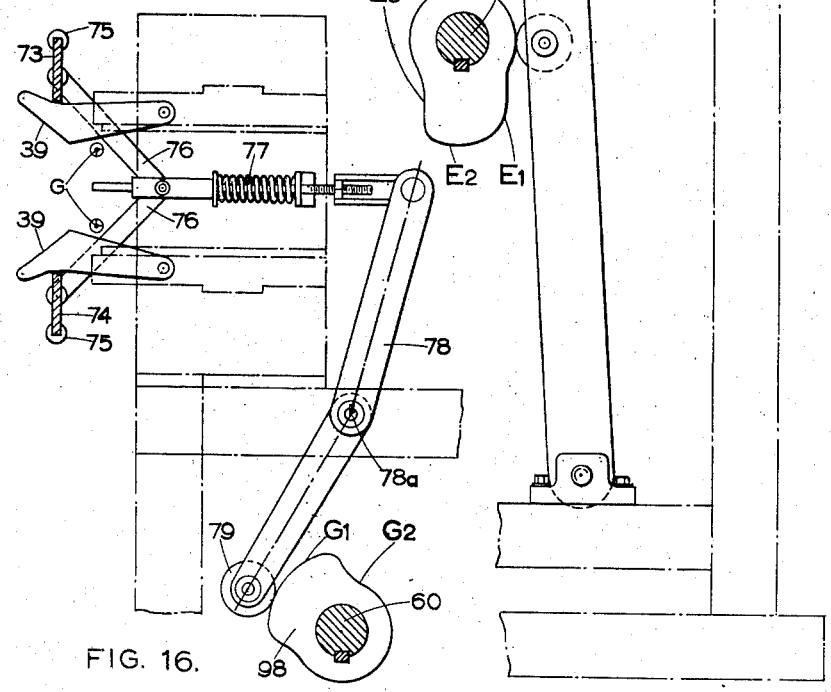

Figure 16 is a side elevation view showing the cam arrangement for operating a pair of bars which produce deformation of the springs in advance of linking up to them by means of the tie wires a second row of springs.

Figures 17 to 21 inclusive show diagrammatically the sequence of operations of a tie wire when being interconnected with a pair of springs.

Figure 22:
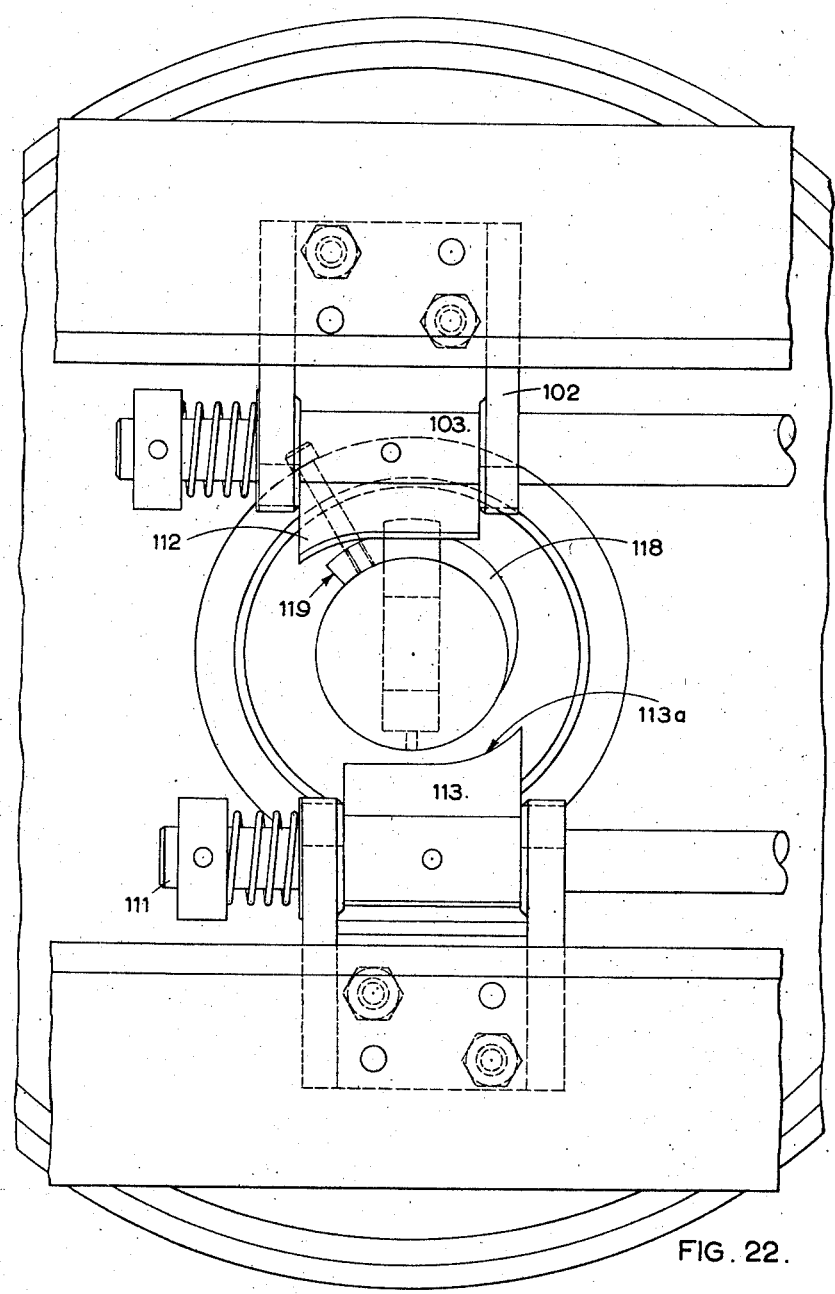

Figure 22 is a side elevation view showing a suitable clutch for selecting two different stages of operation in the machine.

Figure 23:
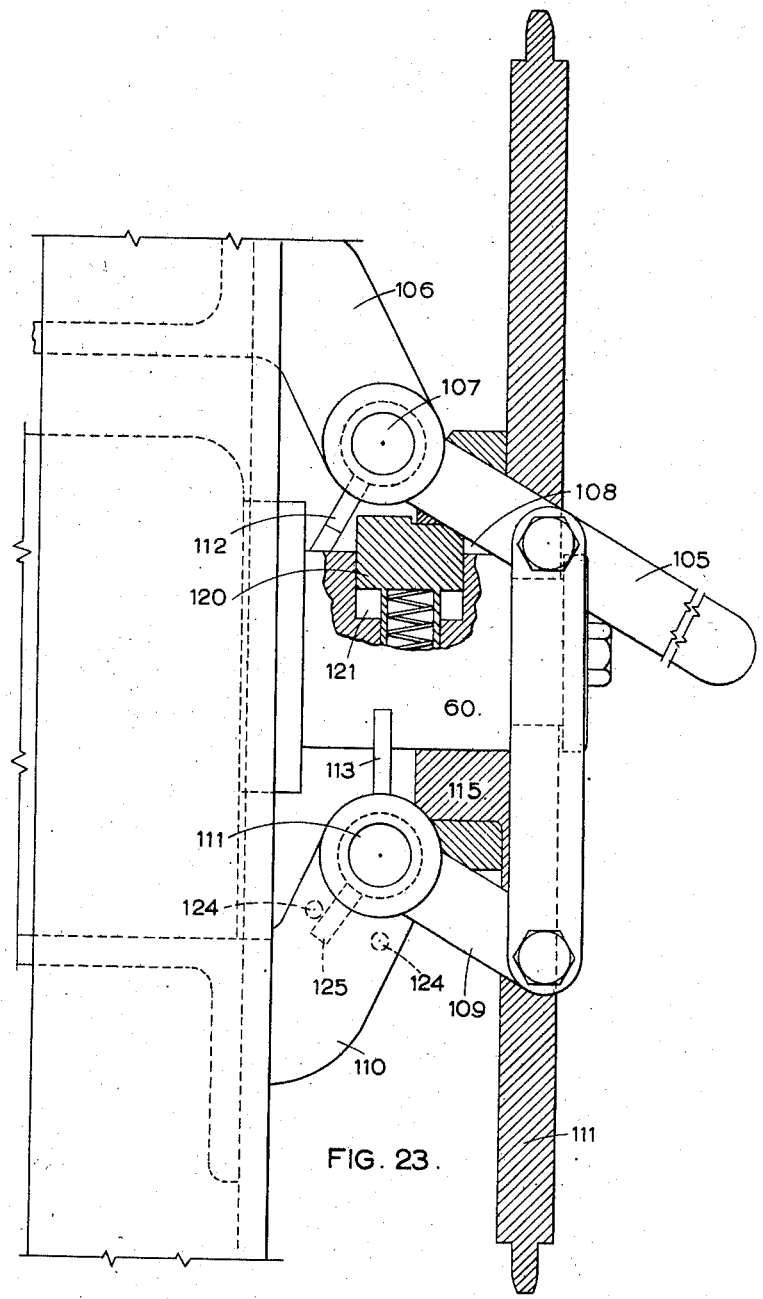

Figure 23 is a part sectional side elevation of Figure 22, and

Figure 24:
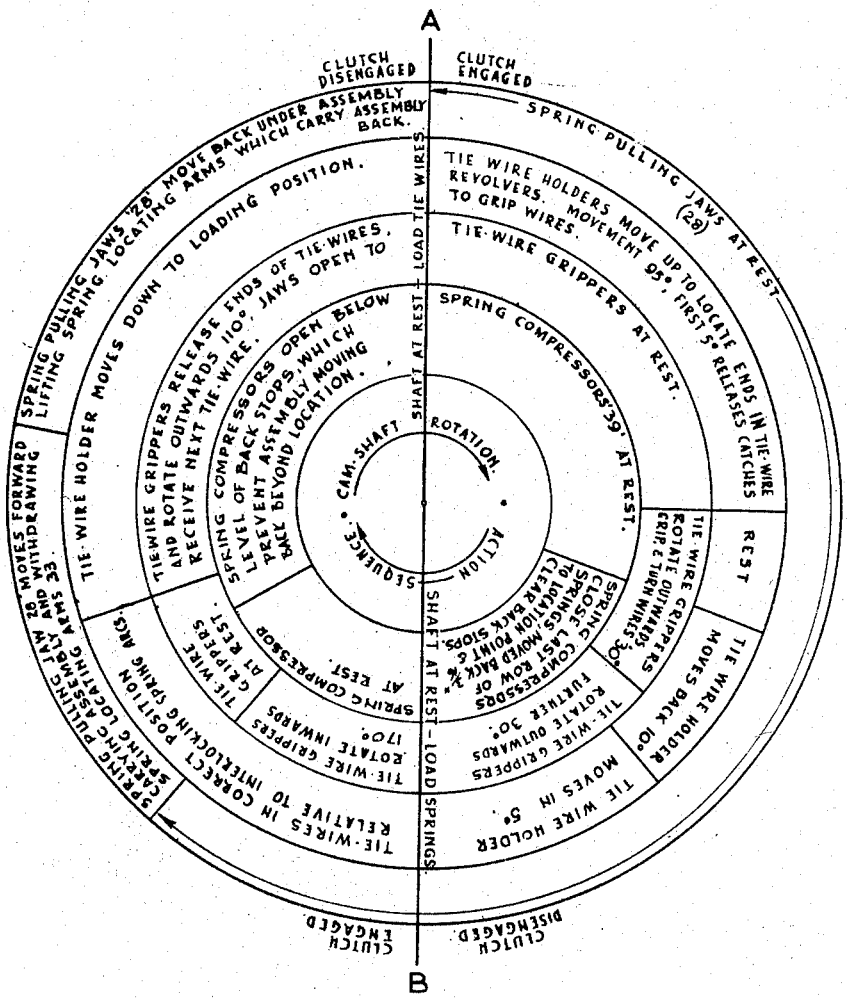

Figure 24 is a chart showing the sequence of operations of the machine.

Figure 1:
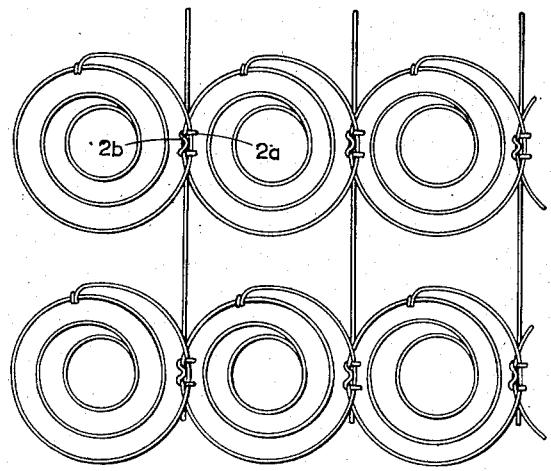
Figure 1 is a plan view of a portion of a spring assembly to be produced by means of the present invention.
Figure 2:
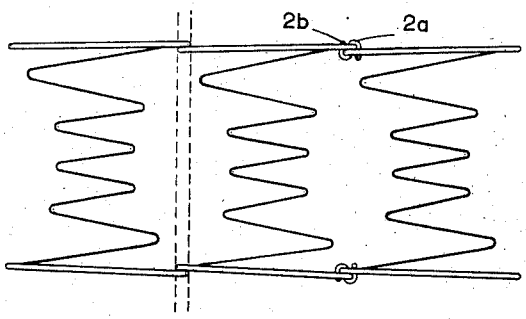
Figure 2 is a side elevation of Figure 1.
Figure 3:
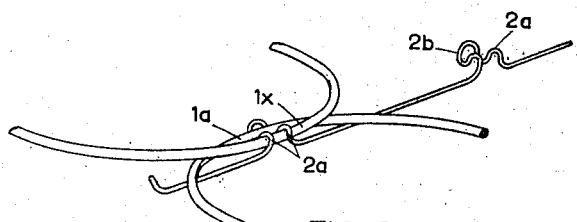
Figure 3 is a perspective view of a part of a tie wire.

Referring to the drawings it will be seen with reference to Figures 1 and 2 that the spring assembly in its finished form has a number of parallel lines of rows of springs 1 of the furniture spring type i. e. with their end convolutions of greater diameter than the remaining convolutions, the springs being secured together so that for each row taking a line passing through their axes when looking at Figure 1 each spring 1, with the exception of the two end springs at a relatively short portion 1a of its periphery at both ends engages against the inner side of the like portion 1x of the adjacent spring, whilst at the diametrically opposed part of the spring the relationship is reversed. The springs are held in this partially overlapping arrangement of their end convolutions by substantially S shaped hook-like projections 2 of tie wires 3 which at present are manipulated by hand into interengagement with the spring end convolutions as shown against one of the hook-like projections 2 in Figure 3, whereupon the complete assembly of springs and tie wires making up, e. g. a complete unit ready for insertion in a mattress cover, is fed through a machine which clinches the projections 2 tightly to the overlapping parts of the spring ends to produce the unit shown in Figure 1. Such a clinching machine is described in co-pending application Serial No. 409,468. The present invention is concerned primarily with a machine which feeds the tie wires in the desired sequence to rows of springs in succession and mechanically effects the operations which produce the same result as at present obtained by manual manipulation of the tie wires into inter-engagement of the spring end convolutions. If so desired the machine may also incorporate clinching means for the hook parts 2 of the tie wires with means, hereinafter described, which feeds the progressively assembled rows of springs and tie wires away from the stage where the tie wires are inter-engaged with the springs, but normally it is preferred to effect the clinching operations in a separate machine.

It will be appreciated from the foregoing that the machine of the present invention must provide for assembling successive rows of springs, and to feed to each row an upper and a lower tie wire, then to ensure that the springs are temporarily deformed to locate their end convolutions in such relationship to the tie wires and to the next row of springs that by rotating the tie wires on their axes in a particular manner the S shaped hook-like projections 2 will so inter-engage with the spring ends that thereupon the rows of springs can be drawn forwards to position the trailing row in the machine ready to repeat the cycle of operations.

Thus when commencing the production of a spring assembly the following operations arise:

(1) Fit the leading row of springs in the part of the machine to where the tie wires have to be fed into position for imparting movement about their axes to link up to the leading row of springs the next row of springs.

(2) Feed two spaced parallel tie wires in a holder up to the leading row of springs so that they are received in grippers and lie slightly inside the radius of end convolutions of the springs already assembled in the machine with one tie wire slightly beneath the upper convolutions of the springs and the other slightly above the lower convolutions of the springs.

(3) Deform the first row of springs to bring their end convolutions close to the tie wires.

(4) Grip the ends of both tie wires in the grippers.

(5) Impart a partial rotation symmetrically to the two grippers so to position the S shaped projections of the tie wires that following the next row of springs having been offered up to the leading row of springs and said two tie wires now positioned as described at (2) above, that subsequent partial rotation of the tie wires in the same direction and then through a greater angle in the reverse direction will hook the S shaped projections 2 of the tie wires into interengagement with the spring ends.

(6) Following the first partial rotation of the tie wires described in (5), offer up the said next row of springs to the first row with the leading parts 1x of the end convolutions of the springs of the said next row engaging over and underneath the rear parts of the upper and lower convolutions respectively of the first row and also deforming the end convolutions of the said next row of springs so that the planes of the end convolutions of one row intersect the planes of the end convolutions of the other row.

(7) Displace slightly rearwardly against stops the first row of springs to ensure that they are located firmly with their end convolutions contacting those of the second row.

(8) Impart to the tie wires the second described partial rotation mentioned in (5) to so position the S shaped projections of the tie wires with the first row of springs that upon effecting the said reverse movement of paragraph (5) through a greater angle of the tie wires the said projections will upon rearward traction of the rows of springs complete their interengagement with the two rows of springs.

(9) Effect the latter mentioned reverse rotation of the tie wires.

(10) Drag forwards the first row of springs so that they draw with them the second row to the position originally occupied by the first row ready to re-commence the cycle of operations to bring in the third row of springs and so on.

(11) Move the tie wire holder back to its normal rest position ready for reloading with two further tie wires.

Now considering the machine as a whole as shown in Figures 4, 4A and 5 and the foregoing sequence of operations the holder in which the two tie wires are located are a series of identical arms 4, hereinafter referred to as the tie wire holder, with transverse parts 5 having V recesses 5a having notches 5b in which the straight parts of the two tie wires are pushed. The tie wires may be held frictionally in position but it is preferred (see Figure 5A) for the tie wires to be gripped by the hook ends 6a of two end pairs of fingers 6 pivoted between their ends at 6b and also pivoted at their other ends remote from their hooks to spring loaded plungers 7 normally pressed down against an abutment bar 8, so that at the initial lifting movement of the holder 4 (clockwise looking at Figure 5) the springs of the plungers will reassert themselves and grip the hook ends of the fingers on to the tie wires to hold them firmly in the holder until they are engaged and gripped by two pairs of rotary grippers indicated generally at G in Figures 4 and 4A, where it will be seen that the grippers are carried by two rectilinear housings 9 (see Figures 6, 7 and 8) secured to upper and lower horizontal bars 10 and 10a respectively fixed to the machine frame F each by a base plate 11 with an angle back stop 11a and a clamping bolt 12 threaded through a lug 13 integral with the base 11.

These grippers are located with their horizontal axes of rotation about five eighths of an inch inside the horizontal planes occupied by the upper and lower convolutions of the aforesaid first row of springs when positioned in the machine ready to receive the next row of springs, and in Figures 4 and 4A there is indicated generally at $C^1$ and $C^2$ the upper and lower lines respectively of spring locators which also act as spring compressors and in between which the row of springs in the machine are (1) held under slight compression, (2) deformed so that their end convolutions are brought out of the parallel so as to lie in planes converging towards a position in front of the machine, and (3) dragged rearwardly by relatively slidable draw bars in the units C and $C^1$ to effect a progressive build up of springs and tie wires into the desired length of spring assembly.

These spring compressor and feeder units C and $C^1$ are more clearly shown in Figures 10, 11 and 12 and for each spring there is provided an opposed symmetrically arranged pair of units, a lower one only being shown, it being understood that the co-operating upper unit is upside down with respect to the lower unit. Each unit comprises a rectangular section body 14 secured by bolts and wing nuts 15 and clamps 16 (see Figure 5) to an associated pair of beams 17 (see Figures 4 and 5) secured by studs 18 to end brackets 19 of the upper part of the machine frame F, the two beams 17 being suitably stiffened and additionally supported between their ends by fixed abutments or brackets carried by the upper part of the machine frame.

Each body 14 has slidable therein a draw bar 20 secured at its rear end by a clamp 21 to the appropriate one of a pair of horizontal cross rods 22 common to a complete line of the compressors $C^1$, $C^2$ these two rods being carried by cross heads 23 (see Figure 5) of rods 24 reciprocating in guides 25 on the end brackets 19 and actuated by a lever 26 fulcrumed to a foot bracket 27, a link 26a taking care of the arc of movement of the upper end of the lever. The draw bar 20 carries at its front end a head 28 having a pair of rearwardly facing jaws 29 which engage under (or over, for the top unit $C^1$) and inside the adjacent end convolution of the spring so that, upon retraction of the two sets of draw bars, the row of springs is dragged rearwardly the distance required to bring the next row of springs into position for receiving the next pair of tie wires, the front part of the head 28 being inclined as at 28a to enable it to slide freely under (or over for the top unit) the appropriate spring.

The base of the appropriate spring of the first row of springs is indicated in Figure 11 by the broken ring S in its initial inclined position in the unit $C^2$ and this lower convolution passes inside the inwardly bent inclined wings 30 of a fixed shield 31 and is held close against such wings by the forward pressure of a pair of lugs 32 upstanding from the front end parts of a pair of side arms 33 pivoted at their rear ends to transverse pin 34 slidable in two identical cam slots 35 in the sides of the body 14 and passing across a slot 36 in the draw bar 20 so that when the draw bar 20 is drawn rearwardly the jaws 29 drag the row of springs with it and at the same time the lugs 32 are lowered about the axis of the pin 34 to remove them from the spring end convolutions. This downward lowering of the lugs 32 is effected by the combined actions of the cam slots 35 and two sinuous cam slots 37 in the forward parts of the side arms 32 sliding along a coaxial pair of pins 38 projecting laterally from a pair of angle plates 39 pivoted to the sides of the body 14 by pins 40 screwed into the body 14. As the transverse pin 34 reaches the rear ends of the cam slots 35 it will have ridden to a position above the draw bar 20 and consequently will not obstruct the completion of the rearward movement of the draw bar 20 to complete the movement necessary to bring the next row of springs into the position previously occupied by the row engaged by the jaws 29 of the draw bars 20. The completion of this movement is shown in Figure 12 in which the shield 31 has one side removed. Upon the return movement of the draw bar a stop 41 close to the slot 36 engages the transverse pin 34 and pushes it back along the cam slots 35 to return the side arms 33 to the position shown in Figure 10.

It will be seen that the spring end convolution rests upon the upper inclined edges 39' of the angle plates 39 and this deforms the spring so that instead of the planes of the two end convolutions being parallel, i. e. normal to the axis of the spring, they converge forwardly and this causes each of them to abut against the straight part of the adjacent one of the two tie wires which, prior to the return of the draw bar 30, have been positioned by the tie wire holder 4 so that the vertical dimension between the two tie wires is less than the distance between the end convolutions of the spring when abutting under slight compression in horizontal planes against the bodies 14. An approximate position of the appropriate tie wire is indicated at $a$ in Figure 10.

The next row of furniture springs to be coupled up to the row which now engages the upper edges 39' of the angle plates 39 are offered up individually by hand and the end convolutions of the new line of springs are tripped over a pair of pawls 43 projecting beyond inclined edges 39a at the forward parts of the angle plates 39 and are held firmly in position by abutting against a pair of laterally inclined side wings 44 projecting forwardly from the front ends of the side arms 33. Coiled compression springs 45 urge the angle plates 39 against bars 73 and 74 hereinafter described.

It is preferred to offer up the row of springs by hand but, if desired the row of springs to be offered up may be fitted under slight compression between spacers in a tray 42 indicated in broken lines and operated either by hand or from a cam shaft 60 of the machine. With such a tray the spring ends would project for about half of their diameters beyond the tray.

The two pairs of tie wire grippers G are shown in Figures 6, 7 and 8. Each gripper is carried by a spindle 46 rotating in bushes 47 in side plates 48 and 49 of the housing 9, the spindles being keyed in identical meshing gear wheels 50 and 51 so that the two spindles rotate simultaneously in opposite directions, oscillatory rotation being imparted thereto by a reciprocating rack bar 52 meshing with the lower gear wheel 53 and sliding along an inclined guide 54 secured between the side plates 48 and 49 and passing with the rack bar through an opening in the base member 10, each rack bar being connected by a link 55 (see Figure 5) to a horizontal rod 55' carried across a pair of parallel arms 56 and 57 pivoted at their rear ends to lugs 58 (see Figures 5 and 13) on the rear of the machine frame and each carrying a roller 59 maintained pressed into engagement with the appropriate one of a pair of identical cams (hereinafter described) on the cam shaft 60, consequently there are a pair of cams and a pair of arms 56, 57 for each pair of tie wire grippers. Coiled tension springs 61 maintain the rollers 59 of these arms in engagement with the appropriate cams.

In Figures 6, 7 and 8 the tie wire grippers are shown in the open position ready to receive the ends of the two tie wires which are cranked as at 3b (Figure 17) at their ends to afford limbs by which the ends of the wires may be held firmly in the grippers. Each gripper comprises a jaw 62 fixed in relation to the spindle 46 and a pivoted jaw 63. The jaw 62 is of three-quarter circular cross section as more clearly shown in Figure 8 into the quarter circular section segmental recess 62' of which is moved the quarter circular segmental cross section jaw 63, the tie wire being gripped between the radial face 62a of the jaw 62 and the opposed face 63a of the jaw 63 these wire gripping faces being formed with recesses 62b and 63b respectively in which is received the cranked end 3a of the tie wire, the adjacent end part of the tie wire lying along a groove 63c of the jaw 63 and held by the pressure of the jaw 63 against the jaw 62 along the axis of rotation of the spindle 46. The jaw 62 has parallel side lugs 64 between which is located a cranked part 63d of the jaw 63 pivoted by a pin 65 passing through said lugs.

A plunger 66 loaded by a spring 66' engages the inner end of the jaw 63 to press it about the pivot pin 65 against the jaw 62 when a tie wire is held between the jaws, and when the tie wire is to be released or to be fed in between the jaws, the jaw 63 is opened by the outer end of its cranked part 63d riding over a cam surface 67 of a cam block 68 pivoted to the stem of a screw 69 threaded into the side wall 49 of the housing 9. A tension spring 70 is connected to each cam member 68 and to a pin 71 in the housing 9, and the cam 67 has an inclined edge 67a along which the free end of the cranked part 63d rides when it moves towards and engages such inclined edge so that a spring pawl action obtains by reason of the end of the jaw part 63d pushing the cam about the pin 69 against the influence of the spring 70. That is to say when this action occurs the jaw part 63d does not ride over the crested surface of the cam but simply trips past the cam. On the reverse rotary movement of the gripper the cam block is immovable and the jaw part 63d rides up on to the crest of the cam to occupy the position shown in Figure 7. This operation is more clearly shown in Figure 9 in which the position $A'$ of the jaw part 63d represents the idle or jaw open position of the gripper and also the condition when the tie wire holder 4 is moving up to engage a tie wire in the gripper jaws. The holder 4 carries the tie wires past the axis of rotation of the grippers to ensure that the cranked ends of the tie wires enter properly between the gripper jaws. The holder then moves back about 10° to the correct position of the tie wires relatively to the springs. When the tie wires are positioned in the jaws the holder 4 remains stationary while the gripper jaws close, this closing being due to the spindles 46 being rotated by the upward movement of the rack bar 52 an amount sufficient to turn the grippers approximately 30° to the position shown at $A^2$. It can be during the first half of this movement, i. e. before the jaws are fully closed, that the tie wire holder is moved back about 10° from the grippers. Following this the grippers move approximately a further 30° to the position $A^3$. The next movement of the grippers is in the reverse direction through about 170° to the position $A^4$ due to a return stroke of the rack bar 52 and it is during this movement that the cam 67 is displaced idly by the jaw part 63d to ensure the jaws remaining closed. The final movement in the cycle of operations which moves the tie wire about its axis is from the position $A^4$ back to the position $A^1$ when the jaw part 63d rides up to the crest of the cam and opens the jaws ready to re-commence the cycle of operations.

During these arcuate movements of the tie wire about its axis its hook-like projections are interengaged with the end convolutions of the two rows of springs so as to bring the part 2a (see Figure 3) of each projection over the part 1x of the appropriate spring of the newly arrived row of springs and the part 2b under the part 1a of the row of springs at the trailing end of the already assembled line of springs between the bodies 14 and extending to a table (not shown) beyond such bodies. The springs must be firmly held against movement during this operation with their end convolutions canted in intersecting planes and this is ensured by a pair of horizontal bars 73 and 74 moved into engagement with the angle plates 39 during the movement from positions $A^1$ to $A^2$ of the tie wire grippers so that by the time the tie wires are held fixedly in the grippers and the spring end convolutions are held between the lugs 32 and wings 36, the latter spring end convolutions are pressed up against the tie wires by the bars 73 and 74 engaging the angle plates 39. This latter condition is maintained until very slightly in advance of the gripper jaws being opened, i. e. up to when the jaw parts 63d move into engagement with the cams 67.

The bars 73 and 74 are secured across blocks 73a and 74a (see Figures 4 and 4A) slidable in vertical guides in uprights $F^1$ of the frame F and these blocks carrying rollers 75 shown diagrammatically in Figure 16 tracking slide bars in the guides, the said blocks being pivoted to the free ends of links 76 (see Figure 16) acting as lazy tong devices connected in end pairs to a pair of horizontal end rods 77 connected axially adjustably to two identical levers 78 fulcrumed at the ends of the frame between their ends as at 78a and at their lower ends carrying rollers 79 engaging identical cams 97 on the ends of the cam shaft 60.

Figures 13, 14, 15 and 16 show the cams on the cam shaft for a given position of the shaft and in which referring to Figure 13 the cam 90 which operates the arm 56 driving the rack bars of the wire grippers is shown with its maximum radius part $R^3$ engaging the roller 59 and this corresponds to the position $A^3$ of Figure 9 in which the grippers have been closed upon the ends of the tie wire. The cam shaft is rotating anti-clockwise so the roller 59 will next move to the position $R^4$ of the cam which produces a downward movement of the rack bar to impart a counter rotation of the wire grippers to the position $A^4$ of Figure 9. As the cam 90 continues to rotate there is a dwell portion $R^5$ during which the grippers still grip on the ends of the tie wires but, despite this, during this stage the springs are drawn by the reciprocating bar out of the grippers. Continued rotation of the cam 90 introduces a gradual lift to the arm 56 until the position $A^1$ of Figure 9 is reached when the jaws are open.

Still further continued rotation of the cam brings the roller into engagement with a slight rise $R^6$ of the cam which produces a closing of the grippers followed by the roller 59 engaging the crest $R^2$ which moves the grippers to the position $A^2$ and produces closing thereof and following this the roller 59 engages a further crest $r^3$ and is traversed by the cam up to the position $R^3$ which results in moving the grippers to the position $A^3$ of Figure 9.

If we now refer to Figure 14 the cam 91 which operates the tie wire holder is shown with its smallest radius engaging a roller 92 on an arm 93 pivoted at 94 and which operates the tie wire holder 4 via a link 95 pivoted to one of a number of bowed arms 96 carrying the holder elements 4 and keyed to a shaft 96a. Thus the holder 4 clearly must be in the position in which it is slightly retracted from the tie wire in the grippers seeing that the tie wire grippers are now in the position of $A^3$ of Figure 9 and there is a slight dwell part $D^1$ which corresponds to the movement from $R^3$ to $R^4$ of the cam 90 and beyond this dwell part there is a progressing rise $D^2$ which corresponds approximately to the dwell part $R^5$ of cam 90 and about half of the travel of the cam 90 from engagement of $R^4$ with the roller 59 to the engagement of $R^6$ with the roller 59 and during this the cam 91 brings its crest $D^3$ into engagement with the roller 92 on the arm 93 so that by now the tie wire holder is fully lowered when we come to a dwell from $D^3$ to $D^4$ during which stage the next pair of tie wires are placed in the holder 4. This lowering of the holder 4 takes place as the spring assembly is pulled forwards to position the trailing row of springs in position ready to recommence the cycle of operations.

It will be appreciated that these co-operating movements of the tie wire grippers and the holder 4 also require making certain that the cranked ends 3b of the wires are offered up to the open jaws of the grippers in planes passing between the open jaws and with their free ends trailing so as to bring the tie wire axes in the axes of rotation of the grippers. For this purpose the cranked ends 3b project from each tie wire approximately in the direction of the S shaped hooks so that when the tie axes are located in the V shaped notches of the holder 4, the wires will, by gravitational influence, set themselves with the hooks and cranked ends pointing downwards. However it is preferred to assist this movement by providing permanent magnets with the holder 4 at positions where their influence will pull down the S shaped parts.

To make certain that the tie wires are guided properly to the grippers there is provided alongside each gripper a forwardly projecting bar 100 with a flared mouth 101 merging into a slot 102 radial with respect to the axis of rotation of the associated gripper and constituted by the gap between two parallel bars 103 projecting from the bar 100 and with their free ends close to but not contacting the gripper. The cranked ends of the tie wires are guided into the flared mouths 101 along the slots 102 into the open grippers.

Referring to Figure 15 the cam 97 operates the reciprocating draw bars 20 and is shown in the position in which the jaws are in their foremost position ready to retract the springs rearwardly, this retraction being effected by the sudden rise $E^1$ of the cam followed by a dwell $E^2$ to maintain the jaws retracted for a very slight period and this is followed by a profile $E^3$ which returns the jaws to their foremost position when they are held by the dwell $E^4$ during the rotary movements of the tie wires about their axes.

Referring to Figure 16 seeing that the grippers are already closed on to the tie wires in the position $A^3$ in Figure 9 the two horizontal bars 73 and 74 which apply pressure to the angle brackets 39 must be in the position which deforms the spring ends on to the tie wires prior to the tie wires being rotated to the position $A^4$, and consequently the maximum radius part $G^1$ of each cam 98 has just made contact with the lever roller 79 of the appropriate lever 78 which operates the lazy tong device 76 to actuate the angle brackets 39 to the spring deforming positions against the influence of a spring 77a, this profile part $G^1$ merging into a smaller radius part $G^2$ which moves the two bars away from each other.

Figure 17:
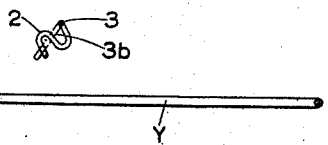
Figure 18:
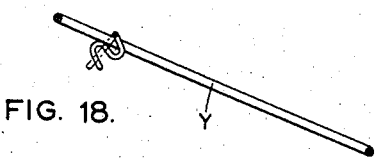
Figure 19:
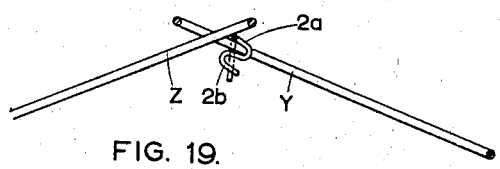

To illustrate the inter-engagement of the hooks of the tie wires with the springs, there is shown in Figures 17–21 inclusive the base convolution Y of a spring located in the machine and the tie wire 3 with its S shaped hook 2 in the position in which it is located in the grippers. In Figure 17 the tie wire is shown when the associated grippers are in the position $A^1$ of Figure 9. Following this stage the end convolutions of the spring Y are deformed as shown in Figure 18 and the grippers have moved to the position $A^2$ and hold the tie wire in the position shown following which the new springs Z are located in the position shown in Figure 19 and the tie wire has been moved to the position $A^3$.

Figure 20:
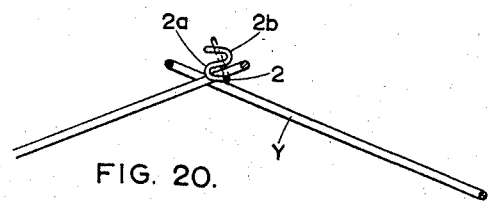
Figure 21:
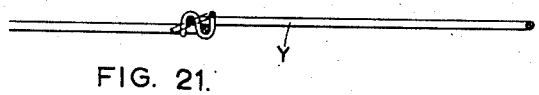

Following this the two tie wires are moved symmetrically in unison in the reverse direction to the position $A^4$ as shown in Figure 20 in which the inner bend 2a of the hook engages inside the spring Z so that its free end hook part 2b is ready to be moved over the trailing part of the spring Y when the springs have a pull applied to them in the direction of the arrow by the sliding jaws 28 so as to engage the free end hook part 2b of the hook 2 over the trailing part of the spring Y. The inter-connecting springs are now ready by a subsequent operation to be clinched to the grippers.

In Figure 24 is a chart showing the foregoing described sequences of operations and it will be seen that there are two stages commencing at A when a clutch for the cam shaft 60 is engaged when the two tie wires have been positioned in the holder 4. At B the clutch is disengaged automatically to provide an idle period when the second row of springs are located between the edges 39a of the angle plates 39 so that the opposed arcs of these springs and the springs on the edges 39' of the angle plates overlap ready to interengage the tie wire hooks with them. The clutch is now engaged by a hand lever to complete the operation and is disengaged automatically when the coupled springs have been drawn back by the draw bars 20.

The clutch for bringing the cam shaft into and out of operation is shown in Figures 22 and 23 and is indicated generally by the refernce numeral 104 in Figure 4A and is operated by a hand lever 105. The hand lever is fixed to a shaft 107 journalled at one end in lugs 106 and the lever 105 is connected to a parallel arm 109 by a link 108, the arm 109 being fixed to a shaft 111 journalled in lugs 110. The shaft 107 carries a radial cam web 112 and the pin 111 a radial cam web 113 these two webs acting as cams which are brought alternately in position by the movement of the hand lever. The shaft 60 has loose thereon the hub 115 of an input sprocket wheel 116 driven from the motor 117 and in this hub 115 is formed a cam shaped recess 118 the radial terminal part 119 of which acts as a positive driving abutment for a spring loaded dog 120 slidable in a radial recess 121 in the shaft 60. It will be appreciated that positive engagement of the dog 120 with the hub 115 will be broken when the dog engages and tracks the cam edge 113a of the web 113 when the cam shaft has rotated from A to B of the chart shown in Figure 24 and so long as the lever 105 is left in the position shown in Figure 23 the cam shaft will remain stationary. Movement of the hand lever 105 upwards will then position the cam web 112 effectively and move the cam web 113 into the inoperative position, the clutch now being engaged until the dog 120 engages the cam web 112 when position A of the said chart is reached.

Inclined plates 122 are provided with the plates 39 to facilitate guiding the springs into engagement with such angle plates.

A pin 125 radiating from the pivot pin 111 of the clutch engages stop pins 124 to locate the cam webs 112 and 113.

When it is required to clinch the S shaped projections of the tie wires into the springs as part of the complete operation of the machine the reciprocating jaws 28 and the bodies 14 can be provided with relatively displaceable clinching devices operated automatically by the reciprocation of the jaws, suitable means for this purpose being described in co-pending application Serial No. 409,468, to pinch the S shaped projections closely about the spring end convolutions to produce the finished spring assembly shown in Figures 1 and 2.

I claim:

1. A method of producing spring assemblies so as to produce a complete assembly in which parallel lines of springs are obtained with the end convolutions of the springs coupled together by tie wires parallel and alternating with the lines of springs and interlaced with the springs by pre-formed substantially S-shaped hook-like parts of the tie wires inter-engaged with the said end convolutions, comprising locating and supporting a first row of springs at the desired spacing, locating adjacent to the end convolutions of the springs two tie wires parallel with the row of springs, deforming the top and bottom convolution of the furniture springs so that their planes, instead of being parallel, are inclined to each other, introducing the next to be assembled row of springs and deformed in a like but opposite manner to the first row so that the planes of the top convolutions of each pair of springs substantially intersect at a chord common to both, and likewise the same with the bottom convolutions, the common chord being of length such as to allow the S-shaped portions of the tie wires to rotate in the space between the arcs between the top and bottom convolutions that have the chord common to each, rotating the tie wires to engage the arcs of the second row of springs, then applying a pull to the springs so as to reduce the length of the common chord at the same time allowing the planes of the end convolutions to become substantially co-planar and rotating the tie wires so that the arcs of the first row of springs are engaged by the S-shaped portion of the tie wires thus locking the two rows of springs together on both top and bottom convolutions simultaneously, and moving the two rows of springs with their tie wires a distance such as to bring the second row of springs into the position formerly occupied by the first row of springs and repeating the cycle of operations with successive rows of springs and pairs of tie wires until the desired length of assembly is achieved.

2. A machine for assembling furniture spring assemblies for mattress and like interiors and each of which assemblies comprises a number of parallel rows of furniture springs coupled together by tie wires and alternating with the springs and each formed with a number of hook-like parts projecting laterally therefrom and inter-engaged with the springs and each having bends each receiving a distinctive spring end, comprising a machine frame, having locating means to locate a row of the springs in the machine ready to receive two tie wires, means to feed a pair of tie wires to positions close to the planes of and slightly inside the peripheries of the upper and lower convolutions of the said row of springs, means to locate a further row of springs close to the aforesaid row of springs so that the planes of such convolutions of one row substantially intersect the planes of the end convolutions of the other row at a chord at the top and another at the bottom common to both, two pairs of grippers in which the ends of the tie wires are received and held automatically following offering up the tie wires to the first mentioned row of springs, compressing means with said locating means to compress the chord of the end convolutions of the springs towards the tie wires so that the arcs common to the chords can be engaged by the hook-like parts of the tie wires, means to impart to the tie wire grippers oscillatory movement about their axes to position the two bends of the hook-like parts one opposite one spring end and one opposite the other spring end preparatory to hooking the tie wires by their hook-like parts to the end convolutions of both rows of springs so as to couple the two rows of springs together, means to apply forward traction to the two rows of springs, means driving said traction applying means between each coupling operation producing said latter positioning of the hook-like parts, said forward traction applying means comprising reciprocating jaws receiving at one terminal position the two lines of springs and their two tie wires and having a stroke approximately equal to the distance between a successive pair of rows of the assembly so as to drag to its other terminal position the assembly of springs and tie wires and means producing an idle return movement of said traction applying means back from said latter terminal position.

3. A machine according to claim 2 wherein said compressing means comprises abutment members displaceable automatically to cant the end convolutions of the springs so that the end convolutions are inclined relatively to the spring axes to bring such convolutions against the tie wires at parts of such convolutions close to the narrowest space between them when canted.

4. A machine according to claim 2 wherein each pair of said locating means comprises devices arranged in symmetrical opposition and each device comprises a guide body, a jaw reciprocating in a side of said body opposed to the adjacent end convolutions of the appropriate spring, said jaw being shaped to slide in one direction over the opposed spring end convolution and in the reverse direction to engage positively the spring end convolution to drag the spring away from the said abutment members, the said jaws reciprocating in unison and means to drive them in the spring assembly moving direction automatically following the coupling thereto by the tie wires of a further set of springs.

5. A machine according to claim 2 wherein at the spring receiving ends the guide bodies are formed each with two side arms pivoted at the ends remote from the spring receiving end of said body on a common axis transverse to the direction of sliding movement of the jaw and located so as to be drawn by the sliding jaw in the direction away from said end of the said body and each arm having a pin and cam slot connection to one of an identical pair of plates located alongside the said guide at a position to engage a spring end, said plates being pivotally supported and abutted against vertically reciprocated driver members and being rocked about their pivoted supports by displacement of said driver members, so that in one position the plates serve to retain a spring in position close to a spring already held in position by said side arms and to be disengaged from the spring when the sliding jaw is retracted.

6. A machine according to claim 5 including at the spring receiving end of each said guide body a pair of opposed side shields each having an inturned part against which the adjacent spring end convolution engaged by said side arms is positioned by reason of rearward pressure of abutments on said arms against the spring end convolution.

7. A machine according to claim 5 wherein said side plates have parallel edges inclined away from the spring engaging face of the guide body to serve as abutments to position and cant the adjacent spring end convolution, said plates each having a pawl-like projection to act as a retainer for the spring.

8. A machine according to claim 5, including a parallel pair of bars moved in opposed directions against said side plates to compress the spring engaged by the side plates.

9. A machine for assembling furniture spring assemblies for mattress and like interiors and each of which assemblies comprises a number of parallel rows of furniture springs coupled together by tie wires parallel with and alternating with the springs and each formed with a number of hook-like parts projecting laterally therefrom and each with bends receiving each a distinctive spring end for inter-lacing with the spring ends, comprising a row of pairs of spring positioning devices between each pair of which a spring is gripped, means to feed the lines of individual tie wires having said hook-like parts in pairs in succession towards the row of springs held in said positioning devices so as to locate the tie wires across the insides of the end convolutions of said springs with their preformed hook-like parts positioned for interlacing with the end convolutions of the springs, gripper means for the tie wires positioned to receive the ends of the two tie wires when so positioned, means to locate a further row of springs alongside the aforesaid row of springs and to bring the planes of the top convolutions of each pair of springs to be tied together into substantially intersecting relationship at a chord common to both, and likewise the same with the bottom convolutions, means imparting turning to the tie wire gripper means about the axes of the tie wires to oppose the bends of the hook-like parts of the tie wires with the appropriate end convolutions of the two successive lines of springs, and traction means applying a pull to the leading row of the two lines of springs away from the position at which the said bends of the projecting parts of the tie wires are positioned opposite the spring ends so that the bends of the tie wire projections link the two rows of springs together, said traction means drawing the second mentioned row of springs in the position occupied previously by the said first mentioned row of springs, said gripper means comprising two sets located adjacent to the end retainer devices, each set comprising a pair of grippers, each gripper comprising a rotary spindle part carrying at one end a pair of jaws between which the adjacent end of the appropriate tie wire is gripped, drivers to oscillate the grippers in unison about the axes of said spindles the jaws being adapted to support the two tie wires along the axes of the grippers of the said two sets, means to open the jaws of the grippers when reaching a starting position of their oscillatory movements, and means to close and maintain the jaws closed during the predominating portion of oscillatory movement so that only during their initial movement from the starting position are they maintained open to receive the ends of the tie wires.

10. A machine according to claim 9 wherein one jaw of each gripper is fixed relatively to the spindle carrying it and the other jaw is pivotally supported and is formed with a projection which rides over a cam to effect opening movement of the pivoted jaw at the starting and fixed position of each complete cycle of movements and during the movement in the direction reverse to its starting movement passing idly past said cam.

11. A machine according to claim 10 wherein each said pair of jaws have opposed tie wire gripping faces parallel with the axis and in prolongation of said spindle.

12. A machine according to claim 10 wherein each said pair of jaws have opposed wire gripping faces, and one of said opposed jaw faces is grooved axially and transversely to receive a tie wire end, the ends of the tie wires being cranked for this purpose.

13. A machine according to claim 10, wherein each said pair of gripper jaws comprises one forming a relatively fixed axial prolongation of the spindle and with a substantially quarter circular segment removed therefrom to receive the correspondingly cross sectioned other jaw, said latter jaw having a cranked part pivoted to the other jaw and riding over an arcuate section cam member held against movement when engaged by said cranked part in one direction of movement of the jaws about the axis of the spindle to open the jaws but yielding to pressure of said cranked part in the reverse direction of movement about said axis so as not to cause opening of the jaws pending return of said cranked part to its normal or starting position.

14. A machine for assembling furniture spring assemblies for mattress and like interiors and each of which assemblies comprises a number of parallel rows of furniture springs coupled together by tie wires parallel with and alternating with the springs and each formed with a number of hook-like parts projecting laterally therefrom and each with bends receiving each a distinctive spring end for inter-lacing with the spring ends, comprising a row of pairs of spring positioning devices between each pair of which a spring is gripped, means to feed the lines of individual tie wires having said hook-like parts in pairs in succession towards the row of springs held in said positioning devices so as to locate the tie wires across the insides of the end convolutions of said springs with their preformed hook-like parts positioned for interlacing with the end convolutions of the springs, gripper means for the tie wires positioned to receive the ends of the two tie wires when so positioned, means to locate a further row of springs alongside the aforesaid row of springs and to bring the planes of the top convolutions of each pair of springs to be tied together into substantially intersecting relationship at a chord common to both, and likewise the same with the bottom convolutions, means imparting turning to the tie wire gripper means about the axes of the tie wires to oppose the bends of the hook-like parts of the tie wires with the appropriate end convolutions of the two successive lines of springs, and traction means applying a pull to the leading row of the two lines of springs away from the position at which the said bends of the projecting parts of the tie wires are positioned opposite the spring ends so that the bends of the tie wire projections link the two rows of springs together, said traction means drawing the second mentioned row of springs in the position occupied previously by the said first mentioned row of springs.

15. A machine for assembling furniture spring assemblies for mattress and like interiors and each of which assemblies comprises a number of parallel rows of furniture springs coupled together by tie wires and alternating with the springs and each formed with a number of hook-like parts projecting laterally therefrom and interengaged with the springs and each having bends each receiving a distinctive spring end, comprising a machine frame, having locating means to locate a row of the springs in the machine ready to receive two tie wires, means to feed a pair of tie wires to positions close to the planes of and slightly inside the peripheries of the upper and lower convolutions of the said row of springs, means to locate a further row of springs close to the aforesaid row of springs so that the planes of such convolutions of one row substantially intersect the planes of the end convolutions of the other row at a chord at the top and another at the bottom common to both, two pairs of grippers in which the ends of the tie wires are received and held automatically following offering up the tie wires to the first mentioned row of springs, compressing means with said locating means to compress the chord of the end convolutions of the springs towards the tie wires so that the arcs common to the chords can be engaged by the hook-like parts of the tie wires, means to impart to the tie wire grippers oscillatory movement about their axes to position the two bends of the hook-like parts one opposite one spring end and one opposite the other end preparatory to hooking the tie wires by their hook-like parts to the end convolutions of both rows of springs to couple the two rows of springs together, means to apply forward traction to the two rows of springs, means driving said traction applying means between each coupling operation producing said latter positioning of the hook-like parts, said forward traction applying means comprising reciprocating jaws receiving at one terminal position the two lines of springs and their two tie wires and having a stroke approximately equal to the distance between a successive pair of rows of the assembly so as to drag to its other terminal position the assembly of springs and tie wires and means producing an idle return movement of said traction applying means back from said latter terminal position, and a holder for a pair of tie wires adapted to receive in spaced parallel relationship a pair of tie wires and means to displace said holder towards the said grippers or means taking over the support of the tie wires and to locate the tie wires in said grippers or means pending such grippers or means being actuated to grip and hold the tie wires.

References Cited in the file of this patent

UNITED STATES PATENTS

| | | |
|---|---|---|
| 2,059,117 | King | Oct. 27, 1936 |
| 2,232,072 | Levine | Feb. 18, 1941 |
| 2,330,244 | Saval | Sept. 28, 1943 |